(12) United States Patent
Holbrook

(10) Patent No.: US 10,723,080 B1
(45) Date of Patent: Jul. 28, 2020

(54) MAKING A PLASTIC TANK HAVING A WELD JOINT BY USING A RESILIENT CLAMP

(71) Applicant: Infiltrator Water Technologies, LLC, Old Saybrook, CT (US)

(72) Inventor: Paul R Holbrook, Old Saybrook, CT (US)

(73) Assignee: Infiltrator Water Technologies, LLC, Old Saybrook, CT (US)

(*) Notice: Subject to any disclaimer, the term of this patent is extended or adjusted under 35 U.S.C. 154(b) by 290 days.

(21) Appl. No.: 15/413,261

(22) Filed: Jan. 23, 2017

Related U.S. Application Data

(60) Provisional application No. 62/286,260, filed on Jan. 22, 2016, provisional application No. 62/286,251, filed on Jan. 22, 2016.

(51) Int. Cl.
| | |
|---|---|
| *B29C 65/02* | (2006.01) |
| *B29C 65/56* | (2006.01) |
| *B65D 88/06* | (2006.01) |
| *B65D 8/02* | (2006.01) |
| *B65D 6/34* | (2006.01) |
| *B65D 45/16* | (2006.01) |
| *B29L 31/00* | (2006.01) |

(52) U.S. Cl.
CPC ............. *B29C 65/02* (2013.01); *B29C 65/56* (2013.01); *B65D 11/08* (2013.01); *B65D 11/22* (2013.01); *B65D 45/16* (2013.01); *B65D 88/06* (2013.01); *B29L 2031/712* (2013.01)

(58) Field of Classification Search
CPC ......... B29C 65/02; B29C 65/56; B65D 45/16; B65D 88/06
See application file for complete search history.

(56) References Cited

U.S. PATENT DOCUMENTS

| | | | | |
|---|---|---|---|---|
| 3,949,663 | A * | 4/1976 | Eckerle | B30B 9/3032 100/229 A |
| 3,981,409 | A * | 9/1976 | Flanders | B65D 7/24 220/4.07 |
| 3,991,902 | A * | 11/1976 | Ford, Jr. | B65D 45/16 220/324 |
| 4,040,372 | A * | 8/1977 | Flanders | B21D 51/20 29/525.04 |
| 4,801,033 | A * | 1/1989 | Kanner | B65D 39/0023 215/277 |
| 5,407,514 | A | 4/1995 | Butts et al. | |
| 5,407,520 | A | 4/1995 | Butts et al. | |
| 5,878,907 | A | 3/1999 | Graf | |

(Continued)

FOREIGN PATENT DOCUMENTS

DE 2624706 12/1977

*Primary Examiner* — Anthony Calandra
*Assistant Examiner* — Eric T Chen
(74) *Attorney, Agent, or Firm* — C. Nessler

(57) ABSTRACT

A plastic tank is comprised of two parts, a base and a top, that are permanently joined to each other by welding at a circumferential joint formed by two mating flanges of the parts. Fusion weld elements are captured on the faying surfaces of the flanges of the assembled parts, and the elements melted by internal heating of metal portions of the elements. Before heating of the elements, the flanges are gripped by a clamp which applies a resilient force which, during welding, causes the flanges to move toward each other and thereby a good weld joint is formed.

6 Claims, 2 Drawing Sheets

(56) References Cited

U.S. PATENT DOCUMENTS

| | | |
|---|---|---|
| 7,984,738 B2 | 7/2011 | Lamarca |
| 8,740,005 B1 | 6/2014 | Holbrook et al. |
| 9,840,040 B2 | 12/2017 | Moore, Jr. |
| 9,889,986 B2 | 2/2018 | Holbrook |
| 10,421,236 B1 | 9/2019 | Moore, Jr. |
| 2008/0067179 A1* | 3/2008 | Graf ................. B29C 65/02 220/565 |
| 2009/0294283 A1* | 12/2009 | Norman ............. B29C 65/16 204/279 |
| 2012/0231272 A1* | 9/2012 | Pinder ............... B29C 65/342 428/377 |
| 2013/0174384 A1* | 7/2013 | Ignaczak ............ F16B 2/08 24/273 |

* cited by examiner

MAKING A PLASTIC TANK HAVING A WELD JOINT BY USING A RESILIENT CLAMP

This application claims benefit of provisional patent application Ser. No. 62/286,251 and Ser. No. 62/286,260, both filed Jan. 22, 2016.

TECHNICAL FIELD

The present invention relates to molded plastic vertical-axis tanks that are useful for storing water and other liquids and methods for making same.

BACKGROUND

It is common to store water in unpressurized above-ground vessels from which water from time to time is drawn by means of pump or gravity flow, particularly where the water supply is intermittent, or where the instantaneous demand exceeds the flow rate of the source of supply. It is particularly desirable, to have a vessel which is sealed against egress or ingress of liquids when potable water is being stored.

The present invention is concerned with plastic tanks that principally are intended for use when oriented as vertical cylinders, including tanks which are much larger than just mentioned. For instance, plastic tanks may have capacities of in the range of about 9,500 liters to about 11,000 liters or more. A representative tank may have a diameter of about 8 feet (2.4 meters), a height of about 8 to 10 feet (2.4 to 3.1 meters), a basic wall thickness of 0.19 to 0.4 inches (4.8 to 10 mm) and a weight of about 250 to 400 pounds (114 to 180) kilograms. If made in one piece, such tanks are difficult and costly to transport because of their bulk. When such tanks are shipped as two nested bucket-like half-tank parts which are welded to each other at or near the point of use that can be a good solution.

Tanks comprised of mating half tanks which can be nested for shipment and assembled in proximity to the point of use have been made. For example, see U.S. Pat. No. 5,878,907 of Graf and U.S. Pat. No. 8,740,005 of Holbrook et al. Such tanks have a mid-elevation joint which is alternatively secured by means of clamps or by means of welding.

A related commonly owned patent application bearing Ser. No. 15/413,219, filed on Jan. 23, 2017 and entitled "Making a plastic tank with a weld joint that enables weld verification," describes how such a tank can be fabricated by welding together two molded bucket-like parts at a circumferential flange.

Because they are large and injection molded, forming such tanks can present unusual welding problems. Because the tank parts being mated are large, they can be subject to slight manufacturing variations (e.g., those related to variations in cooling of hot molded plastic), and possible distortion during handling or temporary storage or uneven sunlight heating, etc. Injection molding is a preferred way of making tank parts because it enables precise wall thickness control. That provides efficient structural use of plastic, compared to parts made with processes such as blow molding and rotational molding that are commonly used to make large plastic structures. But the lightness and thinness of the structures and their large size can lead to unacceptable variation in the weld joint gap, where the fusion weld element might typically be less than 0.2 inch in diameter. The present invention is concerned with the manner in which tank flanges are welded to each other; in particular, it includes the use of certain kinds of clamping. Generally, it is known to clamp things during welding. The present invention employs a relatively uncommon means of fusion welding the flanges of two tank parts: the fusion welding element has means for heating contained within itself, such as a resistance wire or a conductor that is susceptible to heating due to electromagnetically induced eddy currents. The elements include those commercially referred to as PowerCore™ welding rod and Emabond™ preform for use with an Emabond electromagnetic welding system. Those products are described further below.

SUMMARY

An object of the present invention is to provide a large vertical cylindrical style tank that can be shipped as separate nested elements and assembled and then welded. Another object is to provide a tank configuration and components which strengthen and ensures the quality of the weld joint.

In an embodiment of the present invention, a tank is comprised of a top and base which are welded at a joint between mating flanges. A plastic weld joint is formed between the faying surfaces of the flanges by running one or more weld elements circularly around the faying surfaces of the mating circular flanges, preferably so there is a radial space between the legs of the weld element. Preferably the weld element is of the kind which melts when electric power is applied to resistance heating wires that are part of the weld element. Prior to welding, a C-shape cross section clamp is placed on the mated flanges so resilient force within the clamp urges the flanges and their associated faying surfaces toward each other. When the weld element is melted to fuse the faying surfaces, the spring force of the clamp, together with any supplemental axial force that may be applied, causes the flanges to move from their pre-weld spacing to a closer as-welded spacing.

Preferably the clamp has a ridge within the C-shape opening that engages a vertical circular edge (or a plurality of castellations of like nature) at the periphery of one of the flanges, so the clamp stays in place during handling. A typical clamp has a split, both to enable installation and to enable egress of the terminal ends elements. Optionally, a fitting is used to connect the ends of the clamp where the clamp is split, both to enable putting the clamp on the joint, and to enable a convenient place for accessing the terminal ends of the weld element.

The foregoing and other objects, features and advantages of the present invention will become more apparent from the following description of preferred embodiments and accompanying drawings.

DESCRIPTION

Figure 1:
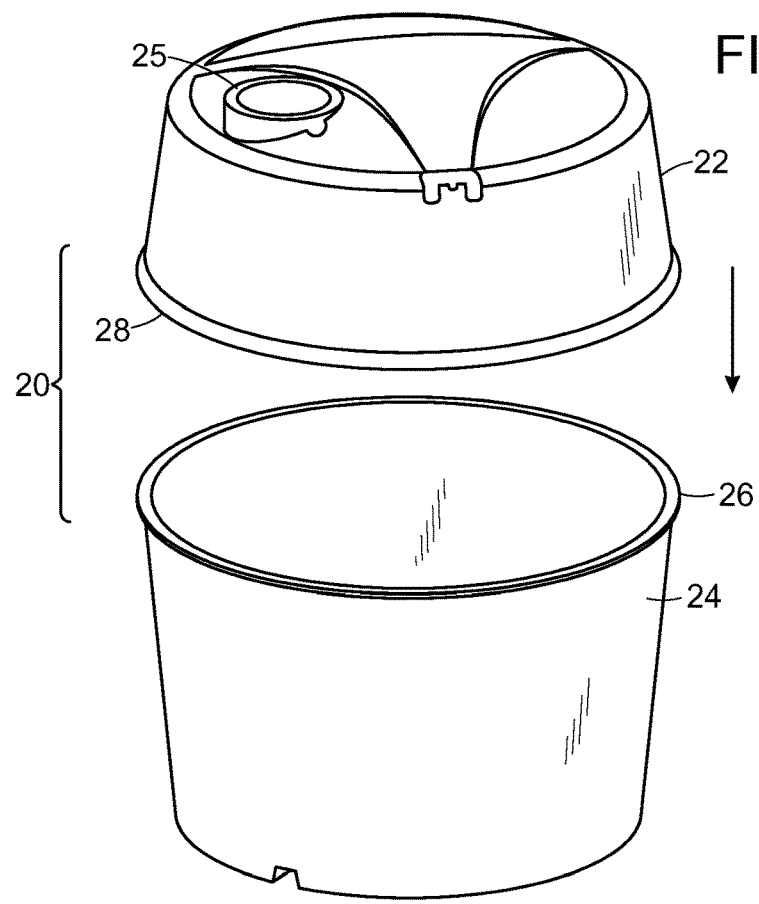
FIG. 1 is exploded view of a plastic tank comprising a base and a top with mating flanges, and a weld element positioned on the flange.
Figure 2:
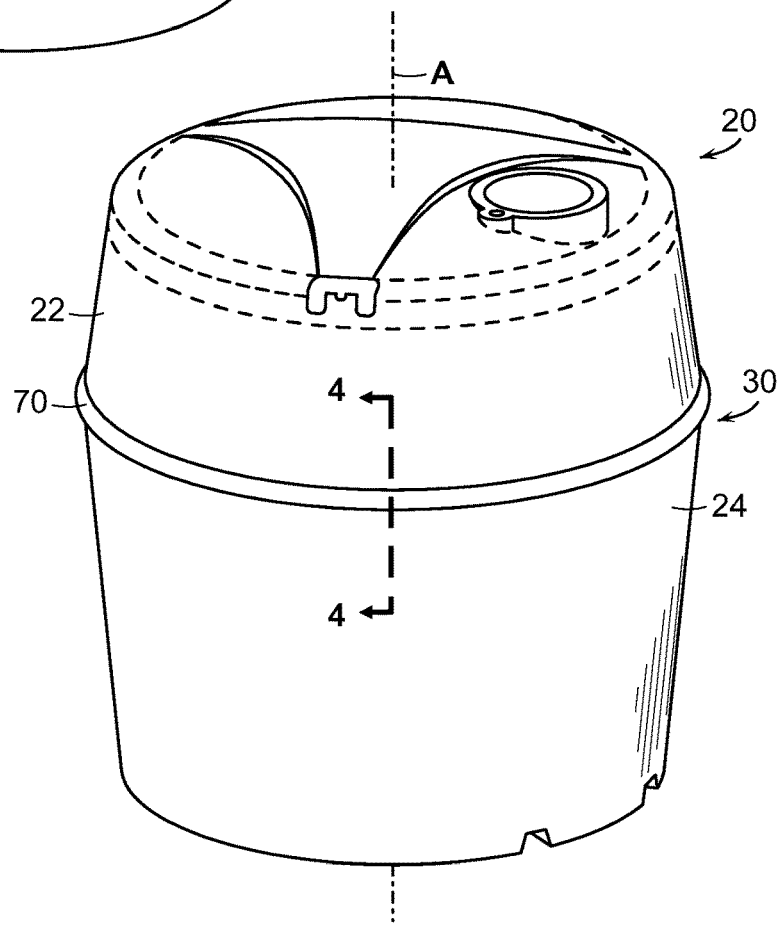
FIG. 2 shows the tank of FIG. 1 after the top has been attached to the base.

FIG. 1 and FIG. 2 show in perspective a plastic water tank 20, preferably made from injection molded polyethylene or polypropylene, having the nominal dimensions recited in the Background. While the invention is described in terms of water, the invention will be applicable to a tank fabricated or used for any liquid, including such as fertilizers and pesticides. While the invention is described in terms of a tank that has a circular cross section, is substantially cylindrical, and is used with the length axis of the cylinder in the vertical orientation, the invention is applicable to tanks having other shapes and orientations. Thus, the term "circular" and its variations, and the terms "top" and "base" will be interpreted appropriately by analogy when the tank flange is non-circular and has non-vertical orientation.

Figure 4:
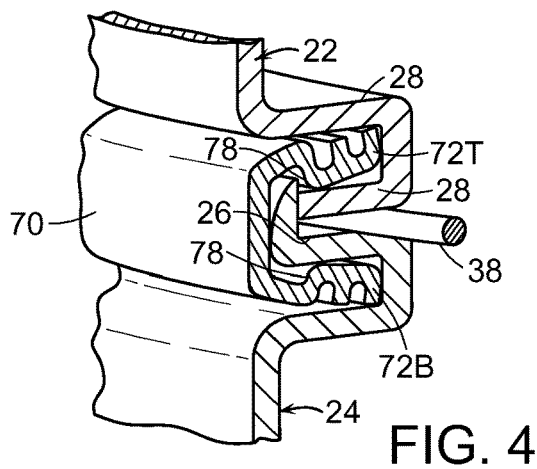
FIG. 4 is a view like FIG. 3, now showing a C-shape cross section clamp in place.

In FIG. 1 the base and top are shown as they are about to mate as indicated by the arrow. In FIG. 2 the parts are mated at joint 30. Tank 20 comprises a base 24 having flange 26 and a top 22 having flange 28, both aligned along a central tank axis A. The flanges mate to each other at joint 30 and a clamp 70 is secured around most of the circumference of the joint, as shown in FIG. 4 and described below. The base and top can be shipped in nested condition on a pallet or the like. The top has an access port 25 for filling, etc. and may have a gage port and other ports. Top 22 has scalloped features, as illustrated, for structural strengthening against exterior loads that may be applied to the top. Corrugations and other strengthening features may be formed in alternative embodiments of bases and tops.

The disclosure of provisional patent application Ser. No. 62/286,260, filed Jan. 22, 2016, entitled "Plastic water tank having flange joint with clamp", is hereby incorporated by reference. In the present invention, the joint between the flanges of the top and base is formed by welding. A preferred method of welding by using an electrically heated weld element captured within the joint is in accord with the technology described in commonly owned patent application Ser. No. 14/993,858 of Bryan Coppes et al., filed Jan. 12, 2016, entitled "Fabricating a plastic stormwater chamber" (the "858 application") and in commonly owned patent application Ser. No. 14/809,124 of R. Moore and P. Holbrook, filed Jul. 24, 2015, entitled "Plastic tank having fusion welded parts" (the "124 application", now U.S. Pat. No. 9,840,040). The method of making a flange joint in a tank is more particularly described in an application of Paul Holbrook et al. being filed on the same day as this application, bearing Ser. No. 15/413,219, filed on Jan. 23, 2017 and entitled "Making a plastic tank with an integrity-verifiable weld joint." A flange joint which can be used while carrying out the present invention has a frusto-conical faying surface portion, as described in another application of Paul Holbrook et al. being filed on the same day as this application, bearing Ser. No. 15/413,247 filed on Jan. 23, 2017 and entitled "Plastic tank having a welded frusto-conical flange joint." The disclosures of all said applications are hereby incorporated by reference.

The just-mentioned applications include a description of how a fusion weld element is placed within the flange joint of a tank so that two circumferential welds are created and define an annular space between them. After the weld has been made, a port that runs from the exterior of the tank to the annular space is connected to a pressure change system, such as a vacuum source or a gas pressure source. If in the space the achieved-pressure change is sustained within certain parameters over time that can be taken to indicate that leak proof welds have been achieved. In carrying out the present invention, such technology may be used.

The fusion weld element (which may be also referred to a fusion element or weld element or simply an element herein) which is used in a preferred embodiment of the method described above is a component which may be heated, such as by electric resistance heating or electromagnetic induction heating to induce melting of a conductive (usually metal) portion of the weld element and local plastic environment, i.e., the faying surfaces adjacent to the weld element. After cooling there is a fusion of both the element and the local plastic material of the parts being joined. Exemplary fusion weld elements comprise plastic with embedded metal pieces that are heated by electric resistance or electromagnetic induction are described further below.

Placement of a fusion weld element may be accomplished in different ways. Preferably a fusion weld element is positioned between the faying surfaces of the mating flanges. As the faying surfaces are pressed against each other, the fusion weld element is raised in temperature sufficient to melt the fusion weld element and local portions of the mating plastic surfaces. The application of electric energy is then ceased and the weld zone is allowed to cool. The resultant solid weld joint is fused plastic which weld-joins the two parts. Some metal artifact from the metal portion of the fusion weld element may remain within the fused plastic weld material. A fusion weld element may be placed on one of the faying surfaces, alternately an element may be placed on each faying surface.

As an example, the fusion weld element may be a commercial product known as PowerCore Welding Rod (PowerCore International Ltd., Ottawa, Ontario, Canada). See also U.S. Pat. Nos. 5,407,514 and 5,407,520, the disclosures of which are hereby incorporated by reference. An exemplary PowerCore brand rod is an about 3/16 inch diameter thermoplastic rod having integrated electric resistance wires of very fine diameter. The ends of the rod run out of the joint/part at selected end points; and when the wires comprising the rod are connected to an electric power source they rise in temperature and heat the rod and surrounding plastic causing melting and fusion. The fine wires remain a part of the finished joint. That portion of the fusion weld element which sticks from the end of the joint is severed, as by chiseling, and discarded.

As another example, the fusion weld element may be the preform which is part of the commercial Emabond™ electromagnetic welding system (Emabond Solutions Co., Norwood, N.J., U.S.) As described in Lamarca U.S. Pat. No. 7,984,738 (the disclosure of which is hereby incorporated by reference) the fusion weld element preform may be a structure comprised of plastic and magnetic particles. This description refers to welding in terms of the PowerCore type of weld element, but it will be understood that an Emabond type weld element may be used.

Figure 5:
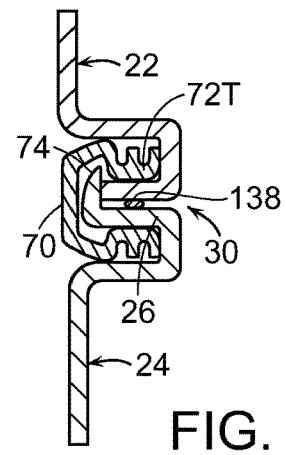
FIG. 5 is a vertical plane cross section of a tank showing the joint after the weld elements have been heated to melt and then fuse to the mated flanges.

This is a précis of what follows: In an embodiment of the present invention, a weld element 38 is placed on one of the flanges 26, 28, preferably by tack welding. When the flanges are mated with each other, as shown in the partial cutaway view of the joint region in FIG. 3 and FIG. 4, electric power is applied to the terminal ends 38T of the weld element which extend outwardly through mating tabs 40T and 40B, to melt the element and adjacent faying surface flange material by resistance heating. FIG. 5 is a vertical cross section through the region where the weld joint 30 is, after the weld element 138 has become flattened, since it has been melted and fused. Comparing FIG. 5 with FIG. 4 and FIG. 3, it can be seen that after welding the flanges have moved closer to each other. As described below, this is a result of the force applied by the clamp 70 and the melting of the weld element.

Figure 3:
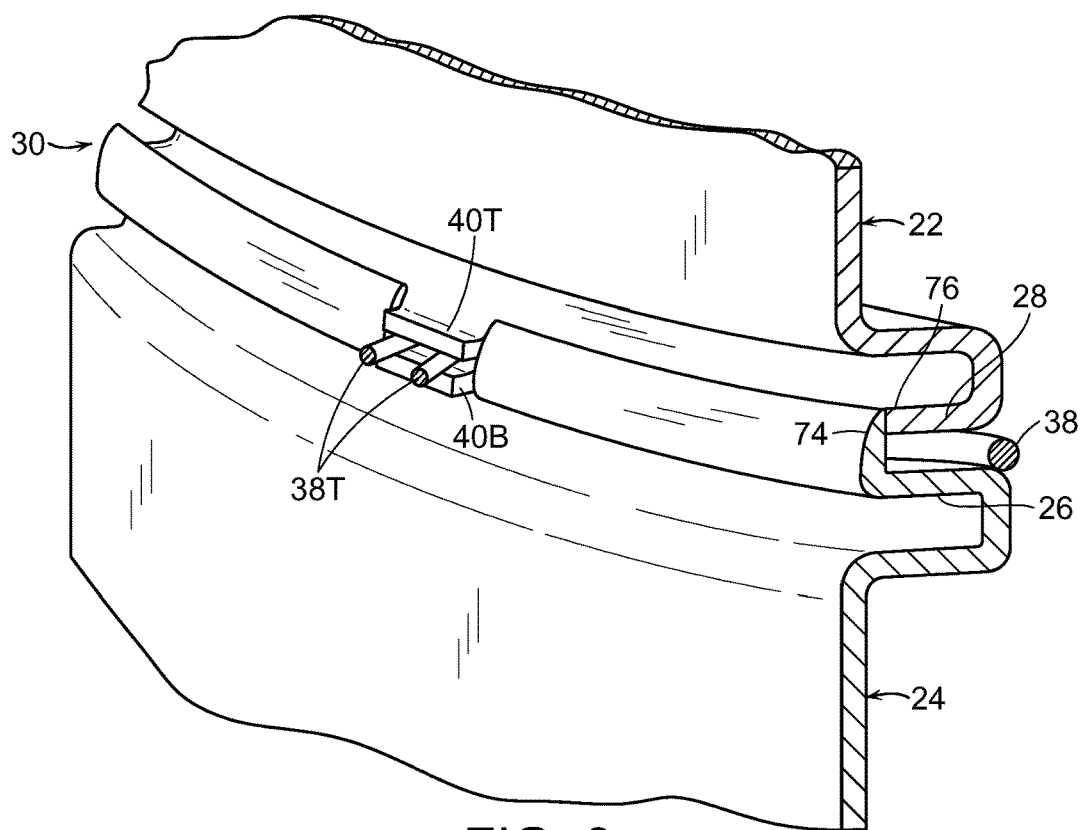
FIG. 3 is a partial perspective view with a cutaway of a base and mated top, showing a weld element captured between the flanges.

Referring to the FIGS. 3 to 5, flange 26 of base 24 has a faying surface which is in contact with fusion weld element 38 and flange 28 of top 22 has a faying surface which is also in contact with the fusion weld element 38. Compressive force is provided to the flanges by clamp 70, which abetted by gravitational force on the top squeezes element 38.

FIG. 3 shows a cutaway of a portion of a tank assembly and the condition of the joint region before a clamp is put in place. The outer edge of flange 26 has an axial (upward in the Figures) extending circumscribing lip 74. Within the bore of lip 74 fits, with radially clearance sufficient to avoid jamming against relative axial movement, the circumferential outer edge 76 of flange 28. It will be appreciated that the features of the mating ends of the base and top could be reversed in alternate embodiments of the invention, e.g., the axial extending lip could be put on the top.

As will be appreciated from review of the related patent applications referred to above, the terminal ends 38T of the fusion weld element run radially outwardly from the mated flanges at a circumferential location where tab 40T (which is integral with flange 28) mates with tab 40B (which is integral with flange 26). The tabs provide an efficacious way of providing a clean flange exterior when removing the terminal ends of an element after welding.

Clamp 70, which is preferably made of strong resilient plastic, optionally of metal with springy character, is shown in working position in FIG. 4. The clamp concavity contains the outer edges of flanges 26, 28 so the legs, which have been spread apart when the clamp was set on the flanges, exert a compressive spring or elastic force on the flanges to push them toward each other. The clamp may be a length of material which has a generally C shape cross section; i.e., a lengthwise channel. From a starting point, the clamp length runs around the joint to an end point which is at or near to the starting point. It will be appreciated that an exemplary clamp desirably has a circumferential gap and starts and ends on either side of the tabs 40T, 40B.

When a fusion weld element(s) is melted, the spring force of the clamp will cause the weld element to flatten as the flanges move toward each other. The spacing between the gripping legs 72T, 72B of the clamp before it is installed, i.e., as it is fabricated, is chosen so that the clamp will be still applying resilient force when the flanges have moved to their home positions (i.e., to that position which is as close to each other as they will get but for the interference of what remains of the now-flattened weld element material). Typically, a weld element will have an about 0.19 inch diameter before it is heated and melted.

Clamp 70 has circumferentially running lightening grooves in the gripping legs 72T, 72B which define the C-shape cross section of clamp 70. See FIG. 4. Clamp 70 also has at least one circularly-running step 78, preferably two steps 78 as shown, within the concavity of the C-shape section. As best shown in FIG. 5 a step 78 of an in-place clamp engages the upward extending lip 74 of flange 26. The engagement of step 78 and flange lip 74 increases when flange 28 moves closer to flange 26 as a result of the melting of the weld element 38. That engagement will keep the clamp from becoming inadvertently loosened during handling subsequent to welding, since as described below it is desirable to keep the clamp in place after welding.

Figure 6:
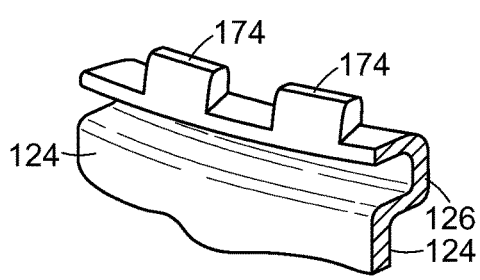
FIG. 6 is a partial perspective view of the flange of a base, showing castellations which are lip segments.

FIG. 6 is a partial perspective view like that of FIG. 3, showing a portion of the base 124 of a tank having a flange 126 that is largely like flange 26, but for having a lip which comprises a plurality of spaced apart tooth-like segments, namely castellations 174. The clamp used with flange 126 may be the same as described for the continuous lip. Alternately, the ridge 78 within the concavity of the C shape clamp may comprise a plurality of castellations that are reciprocal to those of the flange. When that is the case, preferably the castellations of the clamp concavity slip into the spaces between the castellations of the flange when the clamp is put in position. After that placement, the clamp may be slid circumferentially a small amount to lock the clamp in place as each castellation of the clamp moves behind a castellation of the flange.

Figure 7:
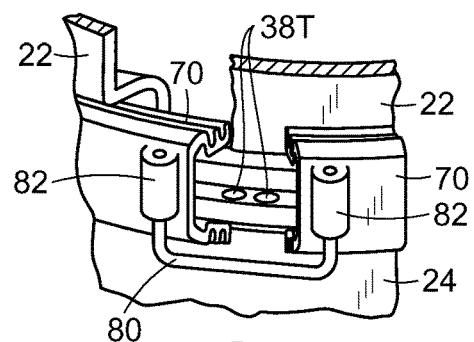
FIG. 7 is a partial perspective cutaway view of a portion of a tank showing the ends of a clamp secured to each other with a latch.

FIG. 7 is a perspective view of a portion of the side of a tank having a clamp 70 on a joint where a weld has been formed. The tank is shown after the tabs 40T, 40B have been sheared away, and all that is left to be seen are the melted stubs of the flattened weld elements' terminal ends 38T. FIG. 7 shows a U-shape latch 80, preferably made of metal or other strong material, which runs between holes in buttresses 82 that were added to the ends of the clamp adjacent the clamp split when it was fabricated. As mentioned, the clamp was necessarily a discontinuous encirclement because of the presence of tabs 40T, 40B when the clamp was placed. After the tabs are sheared off, if the clamp is not to be removed, a latch 80 is installed to connect structurally the clamp ends to each other. Leaving the clamp in place is the foregoing way adds strength of the tank and provides even more assurance that the joint will withstand stress. The latch 80 keeps the clamp tight against the tank exterior, to help carry out that function. In alternative embodiments of the invention, there could be tabs 40T, 40B at other locations and thus more segments of clamps, each with a latch. Other substitutional connecting means may be used to join the ends of the clamp. For example, a metal plate fastened the ends of the clamps by screws or rivets may be run across the space between the ends.

While only a single strand of fusion weld element is shown in the pictures of exemplary embodiments, in alternate embodiments of the present invention a double strand of weld element defines an annular space for convenient weld integrity verification, as taught by the related applications, may be used. While the flanges are shown with faying surfaces which are perpendicular to the faying surfaces, flanges which slope radially inwardly/outwardly may be utilized.

While the invention has been described in terms of its application to a tank, that is, to a vessel which has one or both ends closed, the invention can be used on the flanges of other objects including but not limited to such as lengths of pipe or conduits.

For ease of description, the invention has been described with respect to a tank that is used with the length axis vertical and which therefore has a base and a top. However, the invention can be used with plastic tanks and other structures, where the length axis has a non-vertical orientation. The way in which the preferred embodiments have been described and the use of vertical-axis associated nomenclature shall not be construed so as to limit limiting the generality of the invention; and the scope of claims shall comprehend non-vertical axis orientation articles and their equivalent elements.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method of forming a plastic tank having a weld joint between a flange of a tank base and a mating flange of a tank top, each flange having a faying surface, wherein the base and top have been molded in a first fabrication step and are configured to mate with each other along a lengthwise axis at said flanges, for forming a weld joint therebetween, which comprises:

positioning at least one weld element on at least one said flange faying surface, and mating the base and top with each other so said weld element is captured between the faying surfaces of mated flanges of the base and the top, wherein the mated faying surfaces have a first spacing apart from each other, said spacing defined by the dimensions of the at least one weld element;

mounting on the mated base and top a C-shape cross section plastic clamp comprising legs which define a concavity so at least a portion of the flange of the tank base and at least a portion of the flange of the tank top are contained within the concavity, so the legs of the clamp thereby apply a resilient force to urge the flanges and each respective faying surface thereof toward each other;

heating the at least one weld element to melt and fuse the at least one weld element to both of said flange faying surfaces, wherein said resilient force of the clamp causes said first spacing between the faying surfaces to decrease; and, allowing the at least one weld element to cool and form a solid connection between said mating flanges.

2. The method of claim 1 wherein the clamp further comprises a step within the concavity, and wherein at least one flange of either the tank top or the tank base has a lip; and wherein said step is engaged with said lip.

3. The method of claim wherein the lip comprises a first plurality of castellations and wherein the clamp has a step which comprises a second plurality of castellations shaped to mate with said first plurality of castellations; further comprising: rotating circumferentially the clamp a small amount relative to said mated base and top after the clamp mounted is placed on the flanges.

4. The method of claim 1 wherein the flange of the tank base and the flange of tank top each comprise a tab that extends radially outwardly with respect to said lengthwise axis of the tank, said tabs forming a mating pair of tabs; wherein prior to said heating step said at least one weld element has terminal ends which run radially outward from the mating flanges at a location of the mating pair of tabs; and wherein the clamp has a split thereby forming opposing clamp ends situated on either side of said mating pair of tabs.

5. The method of claim 4 further comprising: after the weld element has cooled, removing the tabs and captured terminal ends of the weld element from the tank without removing portions of the flange.

6. The method of claim 5, further comprising: applying a latch to connect the opposing clamp ends to each other, after the tabs and captured terminal ends of the weld element have been removed from the tank.

\* \* \* \* \*

UNITED STATES PATENT AND TRADEMARK OFFICE
CERTIFICATE OF CORRECTION

PATENT NO. : 10,723,080 B1  
APPLICATION NO. : 15/413261  
DATED : July 28, 2020  
INVENTOR(S) : Paul R. Holbrook Page 1 of 1

It is certified that error appears in the above-identified patent and that said Letters Patent is hereby corrected as shown below:

In the Claims

In Column 8
At Line 12, insert --1-- after "claim"
At Line 17, insert --is-- after "clamp"
At Line 18, delete "is placed on the flanges" and insert --on the mated base and top--

Signed and Sealed this
Thirteenth Day of October, 2020

Andrei Iancu
*Director of the United States Patent and Trademark Office*